United States Patent [19]

Bastioli et al.

[11] Patent Number: 5,569,692
[45] Date of Patent: Oct. 29, 1996

[54] BIODEGRADABLE COMPOSITIONS AND FILMS OR MOULDED ARTICLES OBTAINED THEREFROM

[75] Inventors: Catia Bastioli; Roberto Lombi, both of Novara; Gianfranco Del Tredici, Sesto Calende; Italo Guanella, Romentino, all of Italy

[73] Assignee: Novamont S.p.A., Milan, Italy

[21] Appl. No.: 517,398

[22] Filed: Aug. 21, 1995

Related U.S. Application Data

[63] Continuation of Ser. No. 331,338, Oct. 28, 1994, Pat. No. 5,462,982, which is a continuation of Ser. No. 71,939, Jun. 3, 1993, abandoned, which is a continuation of Ser. No. 821,251, Jan. 10, 1992, abandoned, which is a continuation of Ser. No. 530,916, May 30, 1990, abandoned.

[30] Foreign Application Priority Data

May 30, 1989 [IT] Italy ........................................ 67414/89

[51] Int. Cl.[6] .............................. C08L 89/06; C08L 101/00
[52] U.S. Cl. ................................. 524/47; 524/52; 524/53; 264/328.14
[58] Field of Search ............................. 524/47, 52, 53; 264/328.14

[56] References Cited

U.S. PATENT DOCUMENTS 5,095,054  3/1992  Lay et al. ................................. 524/47

*Primary Examiner*—Nathan M. Nutter
*Attorney, Agent, or Firm*—Bryan Cave LLP

[57] ABSTRACT

In order to prepare a starch-based composition usable for the production of articles of biodegradable plastics material, a starch is mixed in a heated extruder with a high-boiling plasticizer and a destructuring agent for a time sufficient to cause the starch to be destructured, in dependence on the destructuring agent used, at a temperature below the boiling point of the plasticizer used and between 120° and 170° C.

The composition thus obtained is particularly suitable for the formulation of polymer mixtures with polymers which have relatively high melting points, since it can be processed at temperatures higher than 120° C. and is suitable for extrusion at low pressure with these polymers. In particular, compositions thus obtained and mixed with polyvinyl alcohol and/or ethylene vinyl alcohol are suitable for the formation of films by blow-extrusion, since they have the desired characteristics of mechanical strength and resistance to tearing and perforation, or for the formation of articles finished by injection moulding, thermoforming or blowing.

19 Claims, No Drawings

BIODEGRADABLE COMPOSITIONS AND FILMS OR MOULDED ARTICLES OBTAINED THEREFROM

This is a continuation of U.S. patent application Ser. No. 08/331,338, filed Oct. 28, 1994 and now U.S. Pat. No. 5,462,982, which is a continuation of U.S. patent application Ser. No. 08/071,939, filed Jun. 3, 1993, and now abandoned, which is a continuation of U.S. patent application Ser. No. 07/821,251, filed Jan. 10, 1992, and now abandoned, which is incorporated by reference herein and which is a continuation of U.S. patent application Ser. No. 07/530,916, filed May 30, 1990, which is now abandoned.

The present invention relates to a method for the preparation of a destructured-starch-based composition usable for the production of articles of biodegradable plastics material.

In particular, the invention is preferred for the preparation of a starch composition which can easily be mixed with and is compatible with polymers having relatively high melting points, thus enabling the formulation of substantially biodegradable polymer mixtures which, by virtue of the presence of the plastics material with a high melting point, have mechanical, physical and chemical properties which have hitherto been unobtainable.

It is known that the natural starch present in plant products can be treated in a closed container, in the presence of a variable water content, at high temperature and at high pressure (according to the water content) to form a fused thermoplastic material. If the same heat treatment is carried out in the absence of pressure and/or in the absence of water, it causes the cross-linking the material and it is impossible to achieve fusion. As a result of the heat treatment carried out at a temperature higher than the glass transition temperatures and the melting points of the components, fusion occurs and the molecular structure of the starch granules become disordered, producing the so-called "destructured starch".

According to conventional techniques, the destructuring of the starch is carried out in the presence of water added as appropriate and under a pressure which corresponds at least to the vapour pressure of the water present within the extruder.

Published European patent application No. EP-A-0 304 401 describes a method for the production of moulded articles from destructured starch in which, in a first stage, the starch is destructured beforehand in an extruder with water and the composition thus obtained, which has a water content of the order of 10–20%, is reprocessed, in a second stage, in an extruder for subsequent injection moulding. The presence of water in the starch destructured in the first stage limits the workability of the composition which is difficult to mix with other polymers in order to form blends with the desired characteristics, particularly for the formation films. In fact, the composition can be extruded only at relatively low temperatures and under high pressure, so that polymer blends can be produced only with polymers which have low melting points. On the other hand, compositions of destructured starch alone obtained in this way are not suitable for filming processes.

In order to provide compositions which can be converted into films, U.S. Pat. No. 4,133,784 describes compositions of starch and a polymer compatible therewith, constituted by ethylene/acrylic acid (EAA). According to the method of preparation described therein, the starch is gelled by being heated in the presence of water until a viscous dispersion is formed. The EAA component is added to the starch during the gelling stage or thereafter. The compositions thus obtained are suitable for conversion into films only by means of expensive processes such as spreading (casting), simple extrusion or rolling (milling).

In order to increase the gelling speed and thus reduce the quantity of water required, it has been proposed, in the publication Ind. Eng. Chem. Res. 1987, 26 pages 1659–1663, that urea be added to the starch and EAA copolymer composition. By virtue of the addition of urea, it is possible to extrude a semi-dry composition (water content approximately 16%), avoiding the need to mix starch and EAA in a mixer with a large excess of water. The same document describes the addition of polyols to the starch and EAA copolymer formulation with the addition of water, by a technique whereby the components are premixed in a Brabender mixer and are then repeatedly extruded in order progressively to reduce the moisture content of the composition undergoing the process, so as to produce an extrusion suitable for filming by extrusion and blowing. The method described is obviously expensive from the point of view of the energy used since it includes the wasteful addition of water and its subsequent removal by repeated extrusions.

As a result of research carried out by the Applicant, it has been found that if a starch is destructured as it is, with the addition of a high-boiling plasticizer and a destructuring agent, in an extruder heated to a temperature below the boiling point of the plasticizer, destructured starch compositions are obtained which can be mixed with polymers having relatively high melting points and are suitable for extrusion at temperatures higher than 120° C. and at low pressure without problems due to the formation of bubbles, and which are particularly suitable for subsequent operations such as thermoforming and blowing.

The subject of the invention is therefore constituted by a method for the preparation of a destructured-starch-based composition usable for the production of articles of biodegradable plastics material, characterised in that it includes the step of mixing starch as it is, in a heated extruder, with a high-boiling plasticizer and a destructuring agent selected from the group consisting of urea, alkaline and alkaline-earth hydroxides, and mixtures thereof for a time sufficient to bring about the destructuring, and at a temperature below the boiling point of the plasticizer and between 120° and 170° C., preferably between 140° and 170° C.

The starch used in the method comprises in general all starches of natural or plant origin which are composed essentially of amylose and/or amylopectin. They can be extracted from various plants, such as, for example, such as potatoes, rice, tapioca, maize, and cereals such as rye, oats, wheat and the like. Maize starch is preferred. Chemically-modified starches and starches of different genotypes can also be used. The starch is used as it is, without being dried beforehand and without the addition of any water (the intrinsic bound water content of the commercial products is of the order of 10–13% by weight). At destructuring treatment temperatures above 120° C., the water which is present, bound to the starch, does not generate a vapour pressure such as to require high pressures. This constitutes a further advantage of the method according to the invention.

The plasticizer used in the method of the invention is preferably selected from the group consisting of glycerine, polyethylene glycol, preferably with a molecular weight of from 220 to 4000, ethylene glycol, propylene glycol and sorbitol. Plasticizers belonging to the group of polyols having boiling points of at least 150° C. can generally be used.

The quantity of plasticizer added to the starch as it is from 0.05 to 100% of the weight of the starch, preferably from 20 to 100% of the weight of the starch. Urea and sodium, potassium and calcium hydroxides are particularly to be considered as destructuring agents.

Urea is the preferred destructuring agent and is used in a quantity of from 2 to 20% of the weight of the starch. The destructuring operation can be carried out with the addition to the composition of a quantity of ethylene/acrylic acid (EAA) of up to 15% of the total weight of the composition. The use of EAA copolymer, which is compatible with the starch, facilitates the extrusion.

If EAA copolymer is used, particularly for destructured starch compositions which are intended for the production of films by blowing, the use of ammonia is advantageous in a quantity which is not critical but is generally equivalent to at least half of the acid groups in the EAA copolymer. The added ammonia is substantially removed to a residual content of less than 0.5% by weight during the extrusion of the composition.

During the course of the destructuring operation, other additives, either polymeric or monomeric, which do not interfere with the destructuring process may be added to the starch. However, these additives may also be added to the destructured starch composition at a subsequent blending stage preceding the conversion of the composition into the final articles for which it is intended.

For example, polyvinyl alcohol may be added to change the behaviour of moulded articles with water; UV stabilisers, such as, for example, carbon black, may be added to improve the resistance of the articles to sunlight; flame-proofing agents may be added if the moulded articles need to have this property. Other additives include the conventional additives generally incorporated in starch-based moulding compositions, such as fungicides, herbicides, anti-oxidants, fertilisers, and cross-linking agents such as form-aldehyde, paraformaldehyde and the like.

As a result of the method, a destructured starch composition is obtained which can be processed at a temperature higher than 120° C. and which can therefore be extruded without problems due to the formation of bubbles and without the liberation of volatile agents at low pressure.

The composition is particularly suitable for mixing with polymers which have relatively high melting points, such as ethylene/vinyl alcohol, particularly as described in the copending patent application in the name of the Applicant and filed on the same date as the present application.

EXAMPLES 1–4

The starch-based-compositions shown in Table 1, were processed by extrusion with different extrusion temperatures.

TABLE 1

|  | *EX 1 | EX 2 | EX 3 | EX 4 |
|---|---|---|---|---|
| CERESTAR GLOBE 03401 starch (bound water content 11%), % wt. | 63 | 63 | 63 | 63 |
| GLYCERINE % wt. | 25 | 25 | 25 | 25 |
| COPOLYMER EAA 5981 (DOW CHEMICAL) (acrylic acid content 20%), % wt. | 5 | 5 | 5 | — |
| Extrusion Temperature | 100 | 120 | 140 | 140 |

*Comparative Example

The components of the molding compositions of Examples 1–4 were supplied by a Licoarbo DC-10 batcher to a Baker Perkins MPC/V-30 extruder. The double-screw extruder was constituted by a screw unit which was divided into two regions with a screw diameter of 30 mm and a screw length/diameter ratio of 10, and was connected to a single-screw extruder press having a capillary head and a screw of 30 mm diameter with a length/diameter ratio of 8:1 and divided into three regions. The capillary nozzle used had a diameter of 4.5 mm.

The extrusions obtained were made into pellets. A small amount of the pellets resulting from experiments 1 to 4 was compression moulded at the temperature of 140° C. in order to obtain films having the thickness of about 20 microns. The same films were analysed by optical microscopy with polarised light (250× enlargement) and microphotographs were taken in order to ascertain the destructuring of the starch. From the microphotograph relating to comparative experiment 1, it is apparent that the extrusion temperature of 100° C. is too low and does not allow the destructuring of the starch; the microphotograph shows the presence of a large number of still intact starch granules. The analysis of the product obtained from example 2 (extrusion temperature 120° C.) shows that the number of intact starch granules has been substantially reduced, although some are still present. On the other hand, a complete destructuring of the starch is obtained according to example 3 with extrusion temperature of 140° C. The microphotographs obtained from the material of example 3 does not show intact starch granules. The product of example 3 may also be made into pellets without any difficulty.

The analysis of the product of example 4 which was extruded under the condition of example 3, but does not include the EAA-5981 copolymer, shows that satisfactory results are obtained also in the absence of such a copolymer, however some difficulties may be encountered in making pellets from this compositions.

EXAMPLE 5

60% of destructured starch pellets and 40% by weight of CLARENE R 20 ethylene/vynil alcohol copolymer were extruded at 160° C. in the same extruder. The final blend was blown by a HAAKE REOMEX model 252 extruder with an L/D ratio of 19, a screw diameter of 19 mm, and a compression ratio of 1:3, operating with the screw revolving at 40 rpm and provided with a film-blowing head. Rectangular test pieces for tensile testing according to ASTM 882 were formed from the film which where approximately 100 microns thick. The test pieces were conditioned at 23°±1° C. and 55±5% relative humidity for 24 hours, and gave the following average results:

| Young's modulus | 3861 kg/cm$^2$ |
|---|---|
| yielding strain | 43% |
| yielding stress | 164 kg/cm$^2$ |
| breaking strain | 207% |
| breaking stress | 210 kg/cm$^2$ |

The product obtained was characterised by a melting point of 135° C. and a glass transition temperature of 70° C. The films obtained were particularly suitable for use as packaging materials, especially for the production of disposable bags. Even after ageing for prolonged periods, there was no substantial loss of plasticizer and the film produced remained plastic and flexible and was little affected by ambient conditions.

It is intended that destructured starch compositions obtainable by means of the method according to the invention, as well as articles in the form of films or moulded articles produced with the use of the composition, are included in the scope of the invention.

We claim:

1. A biodegradable composition comprising destructured starch, a thermoplastic polymer, and a plasticizer having a boiling point higher than 150° C. in an amount from 20 to 100% based on the weight of starch, said destructured-starch being obtained by destructuring starch as it is, without the addition of water.

2. A biodegradable composition according to claim 1, the biodegradable composition comprising a destructured-starch-based composition and a thermoplastic polymer, the biodegradable composition being produced by contacting the destructured-starch-based composition with the thermoplastic polymer, wherein prior to contacting the destructured-starch-based composition with the thermoplastic polymer, the destructured-starch-based composition is produced by a method comprising:

mixing in the absence of added water and in a heated extruder:

(a) starch that is not dried beforehand, and (b) a high-boiling plasticizer, wherein the quantity of high-boiling plasticizer is from 20 to 100% of the weight of the starch, and (c) a urea destructuring agent, for a time sufficient to bring about destructuring of the starch and at a temperature (i) below the boiling point of the plasticizer, and (ii) between 120° and 170° C.

3. A biodegradable composition according to claim 2, wherein the starch, prior to being destructured, contains less than 13% by weight of water.

4. A biodegradable composition according to claim 3, wherein the starch, prior to being destructured, contains from 10–13% by weight of water.

5. A biodegradable composition according to claim 1, wherein the plasticizer is selected from the group consisting of glycerine, polyethylene glycol, ethylene glycol, propylene glycol, sorbitol, and mixtures thereof.

6. A biodegradable composition according to claim 2, wherein the destructured-starch-based composition further comprises a copolymer selected from the group consisting of ethylene/acrylic acid, polyvinyl alcohol, and mixtures thereof, and wherein the quantity of the copolymer is up to 15% of the total weight of the destructured-starch-based composition.

7. A biodegradable composition according to claim 2, wherein the urea destructuring agent is present in an amount of from 2 to 20% of the weight of the starch.

8. A biodegradable composition according to claim 2, wherein the destructured-starch-based composition further comprises additives selected from the group consisting of UV stabilizers, flameproofing agents, cross-linking agents, fungicides, herbicides, antioxidants, fertilizers, opacifiers, and stabilizers which do not interfere with the destructuring of said starch.

9. A moulded article comprising a biodegradable composition according to claim 1.

10. A film comprising a biodegradable composition according to claim 1.

11. A biodegradable composition comprising:

i. destructured starch;

ii. a thermoplastic polymer; and iii. a plasticizer having a boiling point higher than 150° C., in an amount from 20 to 100% by weight based on the weight of the destructured starch, wherein the biodegradable composition is obtained by a process which includes a process step of destructuring starch prior to contacting it with the thermoplastic polymer by:

(A) mixing in a heated extruder (1) starch that is not dried beforehand, (2) a plasticizer having a boiling point higher than 150° C. wherein the quantity of plasticizer is from 20 to 100% of the weight of the starch, and (3) a urea destructuring agent, (B) for a time sufficient to bring about destructuring of the starch, (C) at a temperature below the boiling point of the plasticizer, and between 120° and 170° C.

12. A biodegradable composition according to claim 11, wherein the starch prior to being destructured contains less than 13% by weight of water.

13. A biodegradable composition according to claim 11, wherein the starch prior to being destructured contains from 10–13% by weight of water.

14. A biodegradable composition according to claim 11, wherein the plasticizer is selected from the group consisting of glycerine, polyethylene glycol, ethylene glycol, propylene glycol, sorbitol, and mixtures thereof.

15. A biodegradable composition according to claim 11, further comprising a copolymer selected from the group consisting of ethylene/acrylic acid, polyvinyl alcohol, and mixtures thereof, wherein the quantity of the copolymer is up to 15% of the total weight of the destructured-starch-based composition produced in steps (A), (B), and (C).

16. A biodegradable composition according to claim 11, wherein the urea destructuring agent is present in an amount of from 2 to 20% of the weight of the starch.

17. A biodegradable composition according to claim 11, further comprising additives to the destructured starch, the additives being selected from the group consisting of UV stabilizers, flameproofing agents, cross-linking agents, fungicides, herbicides, antioxidants, fertilizers, opacifiers, and stabilizers which do not interfere with the destructuring of said starch.

18. A film comprising a biodegradable composition according to claim 11.

19. A moulded article comprising a biodegradable composition according to claim 11.

* * * * *